US008442557B2

(12) United States Patent
Aggarwal et al.

(10) Patent No.: US 8,442,557 B2
(45) Date of Patent: May 14, 2013

(54) METHODS AND APPARATUSES FOR PROVIDING EXPECTED SIGNAL DATA TO A MOBILE STATION

(75) Inventors: Alok Aggarwal, Foster City, CA (US); Payam Pakzad, San Diego, CA (US); Behrooz Khorashadi, San Diego, CA (US); Saumitra M. Das, San Diego, CA (US)

(73) Assignee: QUALCOMM Incorporated, San Diegoc, CA (US)

( * ) Notice: Subject to any disclaimer, the term of this patent is extended or adjusted under 35 U.S.C. 154(b) by 0 days.

(21) Appl. No.: 13/215,801

(22) Filed: Aug. 23, 2011

(65) Prior Publication Data

US 2013/0053067 A1 Feb. 28, 2013

(51) Int. Cl.
*H04W 24/00* (2009.01)
(52) U.S. Cl.
USPC ............. 455/456.2; 455/456.1; 342/432
(58) Field of Classification Search .......... 370/241–254, 370/310–328, 338–341; 709/220–223, 229–244
See application file for complete search history.

(56) References Cited

U.S. PATENT DOCUMENTS

| 2003/0093221 | A1* | 5/2003 | Adachi | 701/208 |
| 2006/0089153 | A1 | 4/2006 | Sheynblat | |
| 2006/0200843 | A1 | 9/2006 | Morgan et al. | |
| 2007/0049291 | A1 | 3/2007 | Kim et al. | |
| 2007/0133487 | A1 | 6/2007 | Wang et al. | |
| 2008/0014963 | A1 | 1/2008 | Takizawa et al. | |
| 2008/0031534 | A1* | 2/2008 | Adachi | 382/243 |
| 2009/0247185 | A1 | 10/2009 | Gilad et al. | |
| 2010/0157848 | A1 | 6/2010 | Das et al. | |
| 2011/0143772 | A1 | 6/2011 | Sridhara et al. | |
| 2012/0149415 | A1* | 6/2012 | Valaee et al. | 455/507 |

OTHER PUBLICATIONS

Bahl P., et al.,"A software system for locating mobile users: design, evaluation and lessons", Internet Citation, Apr. 2000, XP002967193, Retrieved from the Internet : URL: http://citeseer.nj .nec.com/ 296401. html [retrieved on Apr. 1, 2000].
International Search Report and Written Opinion—PCT/US2012/ 051306—ISA/EPO—Dec. 6, 2012.

\* cited by examiner

*Primary Examiner* — Jinsong Hu
*Assistant Examiner* — Magdi Elhag
(74) *Attorney, Agent, or Firm* — Berkeley Law & Technology Group, LLP

(57) ABSTRACT

Techniques are provided which may be implemented using various methods and/or apparatuses to allow for expected signal data for a region of space within a structure to be encoded and transmitted to a mobile station. The mobile station may decode the encoded version and use the resulting decoded version to support signal-based position estimation.

80 Claims, 7 Drawing Sheets

METHODS AND APPARATUSES FOR PROVIDING EXPECTED SIGNAL DATA TO A MOBILE STATION

BACKGROUND

1. Field

The subject matter disclosed herein relates to electronic devices, and more particularly to methods and apparatuses for use in providing expected signal data to a mobile station.

2. Information

The Global Positioning System (GPS) and other like satellite positioning systems have enabled navigation services for mobile handsets in outdoor environments. Since satellite signals may not be always be reliably received and/or acquired in an indoor environment, different techniques may be employed to enable position estimation and related navigation services. For example, mobile stations can typically obtain a position fix by measuring ranges to three or more terrestrial radio transmitters which are positioned at known locations. Such ranges may be measured, for example, by obtaining a MAC ID address from signals received from such access points and measuring one or more characteristics of signals received from such access points such as, for example, signal strength, round trip delay, just to name a few examples.

By way of additional example, a mobile station, such as, a mobile phone, smart phone, etc., may perform signal-based position estimation to identify its location within a structure by taking measurements, for example of a signal strength (e.g., an RSSI) and/or propagation time (e.g., a round-trip time (RTT)) for signals exchanged with various radio transmitters (e.g., access points, beacons, etc.). A mobile station may use these or other like measurements to obtain a probability distribution over a region of space (e.g., defined using two or coordinates (x, y), etc.). Such a probability distribution or other like information may, for example, be used in a particle filter, Kalman filter, and/or other positioning mechanism using known techniques.

To support such a process, expected signal data, such as, may be related to a "heat map", "radio map", and/or other like form of information, may be used for probability lookup. In an example, expected signal data may take the form of a table listing an expected mean and standard deviation of a signal measurement quantity for each identifiable position point (e.g., (x,y) positions, etc.). With such information, a mobile station may convert signal measurements to a probability value for selected candidate position points.

Expected signal data may be provided to a mobile station by one or more remote devices. In certain instances, such as, for a large building or other complex structure, there may be a significant amount of expected signal data to transfer to a mobile station. Consider, for example, a uniformly distributed grid of position points set one meter apart, covering a one hundred meter by one hundred meter floor of a shopping mall. Here, there would be ten thousand position points, for which expected signal data would be provided for each radio transmitter that may support the position estimation capability of the mobile station. Further still, for example, for each position point a mean value and a variation value (e.g., a standard deviation) may be provided. Thus, assuming that such values are represented by one byte of data, in this example the expected signal data for sixteen radio transmitters would take about 320 kB. Moreover, such example shopping mall may have additional floors. Transmitting such a large amount of data from a network to a mobile station may prove costly in terms of power, bandwidth, and latency. Additionally, such expected signal data would also consume a significant amount of memory on the mobile station.

SUMMARY

Techniques are provided which may be implemented using various methods and/or apparatuses to allow for expected signal data for a region of space within a structure to be encoded and transmitted to a mobile station. The mobile station may decode the encoded version and use the resulting decoded version to support signal-based position estimation, navigation, etc.

In accordance with an example implementation, a method may be provided for use with at least one computing device. The method may comprise: obtaining one or more signals representing expected signal data associated with one or more radio transmitters for a region of space within a structure, the expected signal data being associated with a plurality of identifiable position points within the region of space; identifying at least one subset of the plurality of identifiable position points, the at least one subset comprising an anchor point and one or more non-anchor points; determining at least one function relating the expected signal data associated with the anchor point to the expected signal data associated with the one or more non-anchor points; and generating one or more signals representing an encoded version of the expected signal data associated with the one or more radio transmitters for the region of space based, at least in part, on the at least one function.

In accordance with another example implementation, an apparatus may comprise: a network interface; and at least one processing unit to: obtain expected signal data associated with one or more radio transmitters for a region of space within a structure, the expected signal data being associated with a plurality of identifiable position points within the region of space; identify at least one subset of the plurality of identifiable position points, the at least one subset comprising an anchor point and one or more non-anchor points; determine at least one function relating the expected signal data associated with the anchor point to the expected signal data associated with the one or more non-anchor points; determine an encoded version of the expected signal data associated with the one or more radio transmitters for the region of space based, at least in part, on the at least one function; and initiate transmission of at least a portion of the encoded version of the expected signal data to a mobile station via the network interface.

In accordance with yet another example implementation, an apparatus may comprise: means for obtaining expected signal data associated with one or more radio transmitters for a region of space within a structure, the expected signal data being associated with a plurality of identifiable position points within the region of space, wherein at least a portion of the expected signal data is associated with at least one of a signal strength and/or a signal propagation time; means for identifying at least one subset of the plurality of identifiable position points, the at least one subset comprising an anchor point and one or more non-anchor points; means for determining at least one function relating the expected signal data associated with the anchor point to the expected signal data associated with the one or more non-anchor points; means for determining an encoded version of the expected signal data associated with the one or more radio transmitters for the region of space based, at least in part, on the at least one function; and means for transmitting at least a portion of the encoded version of the expected signal data to a mobile station.

In accordance with still another example implementation, an article of manufacture may comprise a computer readable medium having stored therein computer-implementable instructions executable by one or more processing units to: obtain expected signal data associated with one or more radio transmitters for a region of space within a structure, the expected signal data being associated with a plurality of identifiable position points within the region of space, wherein at least a portion of the expected signal data is associated with at least one of a signal strength and/or a signal propagation time; identify at least one subset of the plurality of identifiable position points, the at least one subset comprising an anchor point and one or more non-anchor points; determine at least one function relating the expected signal data associated with the anchor point to the expected signal data associated with the one or more non-anchor points; generate an encoded version of the expected signal data associated with the one or more radio transmitters for the region of space based, at least in part, on the at least one function; and initiate transmission of at least a portion of the encoded version of the expected signal data to a mobile station.

In accordance with a further example implementation, a method may be provided for use with a mobile station. The method may comprise: obtaining one or more signals representing an encoded version of expected signal data associated with one or more radio transmitters for a region of space within a structure, the encoded version of the expected signal data being encoded based, at least in part, on at least one function associated with at least one subset of a plurality of identifiable position points within the region of space, the subset comprising an anchor point and one or more non-anchor points; generating one or more signals representing a decoded version of the expected signal data based, at least in part, on the encoded version of the expected signal data and the at least one function; receiving one or more transmitted signals from at least one of the one or more radio transmitters; and estimating a current position of the mobile station based, at least in part, on the decoded version of the expected signal data and the one or more transmitted signals.

In accordance with certain example implementations, a mobile station may comprise: a network interface; and at least one processing unit to: initiate transmission of a request for at least a portion of an encoded version of an expected signal data associated with one or more radio transmitters for a region of space within a structure, the encoded version of being encoded based, at least in part, on at least one function associated with at least one subset of a plurality of identifiable position points within the region of space, the subset comprising an anchor point and one or more non-anchor points; obtain at least the portion of the encoded version of expected signal data; establish a decoded version of the expected signal data based, at least in part, on the encoded version of the expected signal data and the at least one function; obtain information associated with one or more transmitted signals received via the network interface from at least one of the one or more radio transmitters; and estimate a current position of the mobile station based, at least in part, on the decoded version of the expected signal data and the information associated with the one or more transmitted signals.

In accordance with certain further example implementations, an apparatus for use in a mobile station may comprise: means for initiating transmission of a request for at least a portion of an encoded version of an expected signal data associated with one or more radio transmitters for a region of space within a structure, the encoded version of being encoded based, at least in part, on at least one function associated with at least one subset of a plurality of identifiable position points within the region of space, the subset comprising an anchor point and one or more non-anchor points; means for obtaining at least the portion of the encoded version of expected signal data; means for establishing a decoded version of the expected signal data based, at least in part, on the encoded version of the expected signal data and the at least one function; means for receiving one or more transmitted signals from at least one of the one or more radio transmitters; and means for estimating a current position of the mobile station based, at least in part, on the decoded version of the expected signal data and the one or more transmitted signals.

In accordance with still other certain example implementations, an article of manufacture may comprise a computer readable medium having stored therein computer-implementable instructions executable by one or more processing units of a mobile station to: initiate transmission of a request for at least a portion of an encoded version of an expected signal data associated with one or more radio transmitters for a region of space within a structure, the encoded version of being encoded based, at least in part, on at least one function associated with at least one subset of a plurality of identifiable position points within the region of space, the subset comprising an anchor point and one or more non-anchor points; obtain at least the portion of the encoded version of expected signal data; establish a decoded version of the expected signal data based, at least in part, on the encoded version of the expected signal data and the at least one function; obtain information associated with one or more transmitted signals received from at least one of the one or more radio transmitters; and estimate a current position of the mobile station based, at least in part, on the decoded version of the expected signal data and the information associated with the one or more transmitted signals.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
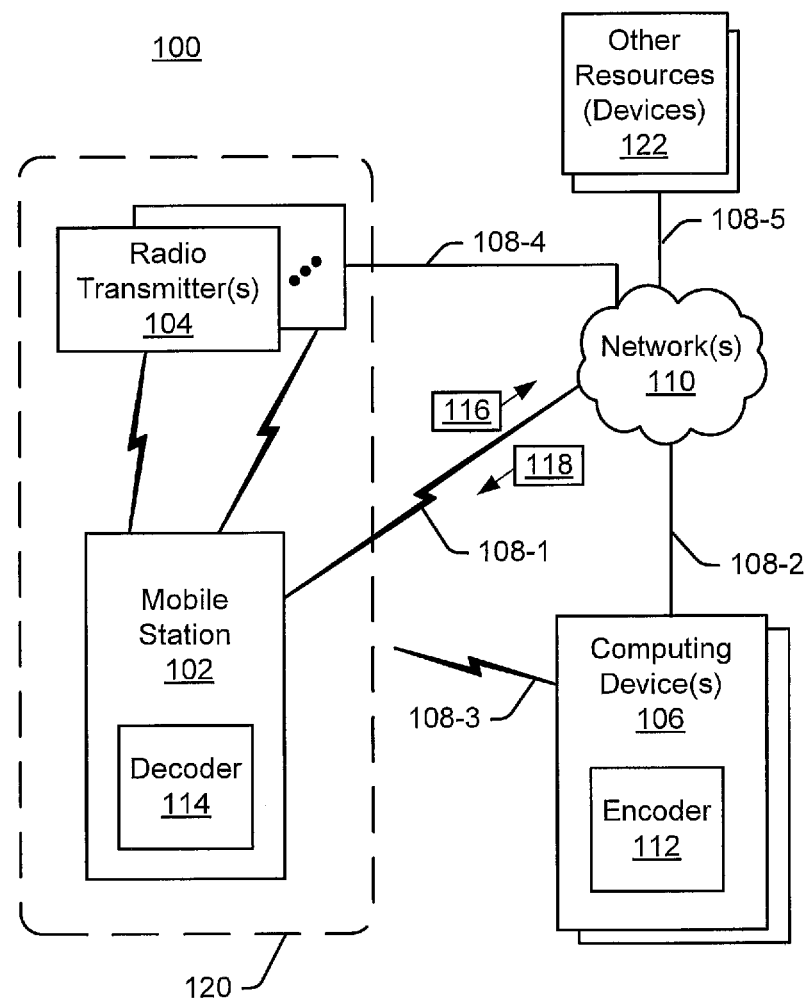
FIG. 1 is a schematic block diagram illustrating an example environment that includes one or more computing devices capable of providing an encoded version of expected signal data to a mobile station, in accordance with an implementation.

In accordance with certain aspects, example techniques are provided which may be implemented using various methods and/or apparatuses to provide expected signal data to mobile stations. Here, for example, all or part of the expected signal data may be encoded to reduce the amount of data to be provided to and/or stored/processed by a mobile station. A mobile station may subsequently decode all or part of the encoded version of expected signal data to establish a decoded version of expected signal data. Thus, in one respect, an example implementation of the techniques provided herein may serve to significantly compress expected signal data.

By way of example, consider again a structure defining a region having ten thousand position points and sixteen radio transmitters, wherein mean and standard deviation values for each radio transmitter at each position point are each represented by one byte of data. The original expected signal data (for all radio transmitters) would amount to about 320 kB. In an example implementation of the encoding techniques provided herein, an encoded version of expected signal data may be reduced in size significantly. For example, as described in greater detail herein, in certain instances such an encoded version of expected signal data may be reduced in size to about 32 kB or less.

To provide such data reduction, in accordance with an example implementation, one or more computing devices may obtain expected signal data associated with one or more radio transmitters for a region of space within a structure. Here, for example, the expected signal data being associated with a plurality of identifiable position points within the region of space. The computing device(s) may apply various techniques to identify at least one subset of the identifiable position points for which an anchor point may selected along with one or more relatable non-anchor points. As such, the computing device(s) may determine at least one function relating the expected signal data associated with the anchor point to the expected signal data associated with the non-anchor point(s). The computing device(s) may then establish an encoded version of expected signal data associated with the radio transmitters) for the region of space based, at least in part, on the function(s).

Thus, for example, as described in greater detail herein, rather than list expected signal data for every positioning point and for every radio transmitter, an encoded version of expected signal data may comprise certain expected signal data for anchor points along with functional parameters which may be employed to determine a decoded version of expected signal data for non-anchor points. An encoded version of expected signal data may indicate in various manners that there is a relationship between an anchor point and one or more non-anchor points.

In certain further example implementations, additional efficiency may be introduced by selecting subsets of anchor and non-anchor points based on additional information. For example, such additional information may relate to an expected navigation route, a characteristic of a given structure, a particular period of time, a particular type of radio receiver, a particular type of transmitted signal, etc. Furthermore, for example, efficiency may be improved by selectively transmitting encoded versions of expected signal data for certain subsets, e.g., at specific instances. As described in greater detail herein, such capability may allow of a "tiling" effect for potentially large map/graphs.

Again, by way of example, consider the situation with ten thousand position points and sixteen radio transmitters, where mean and standard deviation are each represented by one byte. Let us assume that five hundred and twelve anchor points have been selected and that each anchor point will only selectively be related to its eight (e.g., most applicable) radio transmitters identified via a sixteen-bit bitmap. Here, assume further that, for a selected function, one byte is used for each of the model parameter values (e.g., coefficients $c_1$, $c_2$, $c_3$, and $c_4$). Also, suppose each non-anchor point may have its relationship to an anchor point identified using the anchor point's sixteen-bit identifier. As such, in this example, an encoded version of expected signal data may amount to a size of about 35 kB. In a further non-limiting example, if the non-anchor points are listed along with the anchor point's data (e.g., immediately after the corresponding anchors) rather than using explicit references, a tiled effect may be introduced such that the resulting encoded version of expected signal data may amount to a size of about 16 kB.

Attention is drawn now to FIG. 1 which is a schematic block diagram illustrating an example environment 100 that includes one or more computing devices 106 capable of providing one or more encoded versions of expected signal data to a mobile station 102, in accordance with an implementation.

Mobile station 102 is representative of any electronic device that may be reasonably moved about by a user. By way of example but not limitation, mobile station 102 may comprise a computing and/or communication device such as a mobile telephone, a smartphone, a lap top computer, a tablet computer, a wearable computer, a personal digital assistant, a navigation device, etc.

Mobile station 102 and computing devices 106 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

FIG. 1 also illustrates a plurality of radio transmitters 104, various communication links 108, one or more networks 110, an encoder 112 (e.g., for establishing an encoded version of expected signal data), a decoder 114 (e.g., for establishing a decoded version of expected signal data), a request 116 (e.g., for encoded version of expected signal data), a response 118 (e.g., providing encoded version of expected signal data), a structure 120, and one or more other resources 122.

As illustrated, mobile station 102 may transmit a request 116 for one or more encoded versions of expected signal data via at least one communication link 108 to at least one computing device 106. Mobile station 102 may receive a response 118 comprising one or more encoded versions of expected signal data via at least one communication link 108 from at least one computing device 106. Here, for example, request 116 and/or response 118 may take the form of one or more messages transmitted via wireless communication link 108-1, network(s) 110, and non-wireless communication link 108-2, and/or directly via wireless communication link 108-3.

In certain example implementations, mobile station 102 may receive a response 118 and/or other like transmission comprising one or more encoded versions of expected signal data without necessarily having requested such. For example, computing device(s) 106 may be enabled to determine that mobile station 102 has entered into or is expected to soon enter into a structure 120 and/or specific region therein, and as such may independently initiate transmission of one or more encoded versions of expected signal data.

It should be recognized that one or more communication links 108 shown in FIG. 1, may comprise one or more wireless communication links and/or one or more non-wireless communication links (e.g., with signals transmitted using one or more wires, fibers, etc.), and that such communication links 108 and/or network(s) 110 may also represent various supporting devices and/or technologies associated therewith.

In this example, structure 120 is representative of any manmade and/or naturally occurring set of physical features for which expected signal data may be provided to support signal-based position estimation capabilities of mobile station 102. Thus, for example, structure 120 may represent a building or set of buildings, an airport, an arena, a warehouse, a campus, a zoo, etc. In such instances, various location based services may be provided to further enhance a user's experience in navigating about structure 120 using mobile station 102. For example, context information and/or other useful information may be provided to a mobile station 102 as part of a location based service for a given structure. By way of example, a wireless access point located at or near structure 120 (or elsewhere) may transmit information relating to location based services to mobile station 102. In certain example implementations, such information may comprise encoded version(s) of expected signal data.

Radio transmitter(s) 104, in this example, are representative of any device that may transmit one or more wireless signals which may be used by mobile station 102 for estimating its position. For example, a radio transmitter 104 may comprise a special purpose location beacon device, a network access point device, a base station, a femtocell or picocell device, and/or the like. A location of radio transmitter 104 may be provided to mobile station in advance and/or via one or more transmitted signals.

In a non-limiting example, the expected signal data may be associated with expected signal strengths and/or signal propagation times which may be considered in estimating a distance from mobile station to a radio transmitter. Here, for example, such expected signal data may be based, at least in part, on previously measured signal data and/or estimated signal data (e.g., modeled signal data).

As described in greater detail herein, in certain example implementations, all or part the encoded version of expected signal data may be associated with a particular period of time, a particular type of radio receiver, a particular type of transmitted signal, etc.

Figure 2:
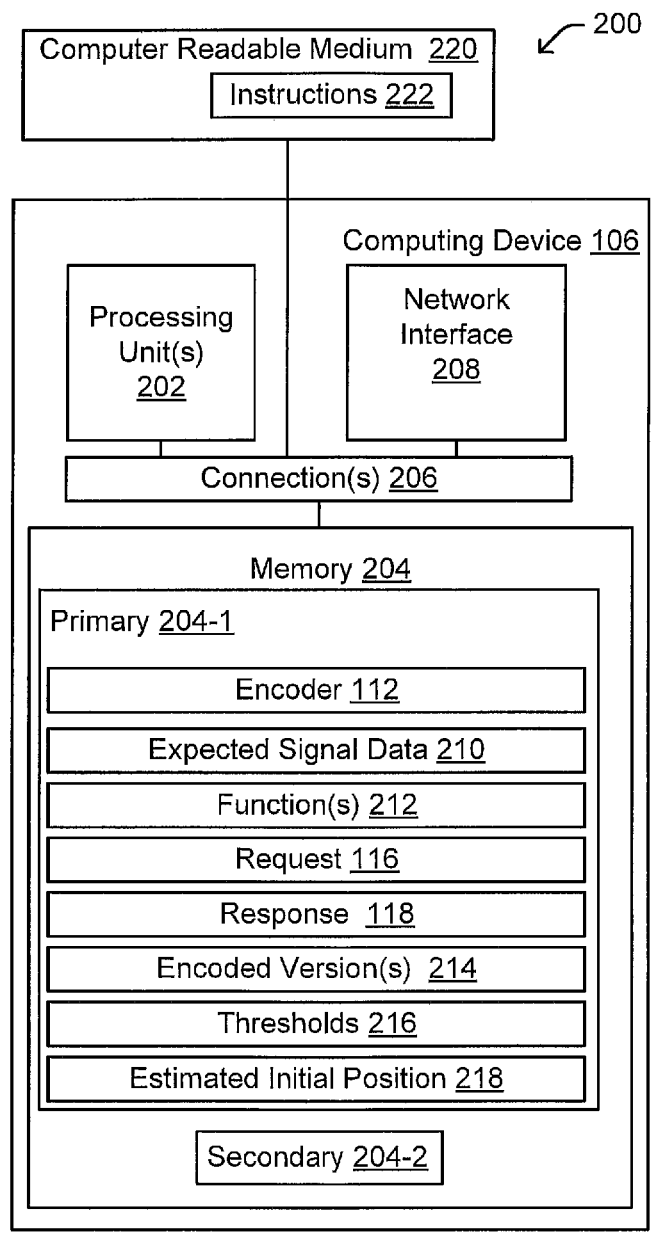
FIG. 2 is a schematic block diagram illustrating certain features of an example computing device capable of providing an encoded version of expected signal data to a mobile station, in accordance with an implementation.

Reference is made next to FIG. 2, which is a schematic block diagram illustrating certain features of computing device 106 capable of providing an encoded version of expected signal data to a mobile station.

FIG. 2 shows a specific apparatus 200 in the form of a computing device 106, one or more of which may act, at least in part, as an encoder 112 to establish one or more encoded versions 214 of the expected signal data for use by one or more mobile stations 102. In certain example implementations, apparatus 200 may act as an individual server, part of a server farm, part of a cloud computing arrangement, etc. In certain example implementations, apparatus 200 may act as part of a network 110, e.g., at a base station, an access point, etc. In certain example implementations, apparatus 200 may comprise and/or be coupled to one or more other resources (devices) 122 that may be arranged to provide information such as expected signal data 210.

With this mind, as illustrated in FIG. 2, example computing device 106 may comprise one or more processing units 202, memory 204, connections 206, and a network interface 208. As shown, memory 204 may comprise a primary memory 204-1, and/or a secondary memory 204-2. Here, for example, primary memory 204-1 may store computer-implementable instructions and/or data relating to encoder 112, which may be executed or used by processing unit(s) 202.

As illustrated, at certain times primary memory 204-1 may, for example, store information relating to one or more requests 116 for encoded versions 214 of expected signal data and/or one or more responses 118. For example, a request 116 for an encoded version 214 may be received from mobile station 102 via network interface 208. For example, a response 118 may be generated by processing unit(s) 202 and transmitted to mobile station 102 via network interface 208. Network interface 208 may, for example, comprise one or more wireless transmitters/receivers and/or one or more non-wireless interfaces (e.g., Ethernet, etc.).

In certain example implementations, computing device 106 may be arranged to establish an encoded version 214 of expected signal data by identifying at least one subset of position points comprising an anchor point and one or more non-anchor points. Thus, by way of example, a subset may be identified based, at least in part, on one or more signal data thresholds 216 and expected signal data 210. Here, for example, position points may be identified as candidates for a subset based on whether certain expected signal data for particular radio transmitter falls within a threshold range. For example, it may be that given a characteristic of a region of space within a structure and/or a type of radio transmitter/signal that expected signal data for position points within the region of space (e.g., a room, hallway, etc.) fall within a particular range of values (e.g., as might relate to some mathematical and/or probabilistic function).

Other information may also and/or alternatively be considered in identifying a subset of position points and/or selecting an anchor point. For example, an estimated initial position

218 of a mobile station may be considered. Here, for example, an estimated initial position 218 may be identified by a mobile station in a request 116. For example, a mobile station may provide a GPS estimated position, etc. In certain example implementations, computing device 106, network 110 and/or other resource 122 may provide an estimated initial position 218.

In certain example implementations, to identify a subset of position points and/or select an anchor point, an expected navigation route may be considered. Thus, for example, a subset may relate to a contiguous region of space that a user may travel through, such as, for example, at least part of one or more corridors, etc. In certain examples, such routing information may be learned or otherwise identified over time by monitoring user traffic, etc.

In other example implementations, to identify a subset of position points and/or select an anchor point, one or more particular periods of time may be taken into consideration. For example, there may be periods of time wherein certain transmitters operate in different manners (e.g., ON or OFF, higher or lower transmit power, etc.). For example, there may be certain regions of space which may or may not be entered/exited or otherwise traversed.

In still other example implementations, to identify a subset of position points and/or select an anchor point, it may be beneficial to identify or otherwise consider which radio transmitters 104 may be more useful for use in signal-based position estimation performed by one or more mobile stations and/or a specific type of mobile station. For example, subsets may be identified in a manner that is likely to provide for reception of transmitted signals from at least a threshold number of radio transmitters at or near an anchor point and/or its one or more related non-anchor points.

In yet another example, to identify a subset of position points and/or select an anchor point, it may be beneficial to consider the number and/or pattern of candidate position points. For example, it may be useful to either limit the number of position points in a subset in some manner (e.g., in consideration of data size, processing overhead, type of function used to model expected signal data, type of mobile station, context relating to region of space/structure, etc.). In certain instances, it may further be useful to select a subset of position points based, at least in part, on whether the various position points are uniformly distributed and/or non-uniformly distributed.

With these non-limiting examples in mind, it should be recognized that the act of identifying a subset of position points and/or selecting an anchor point and its related non-anchor points may be performed in advance (e.g., via offline processing) and/or dynamically. Regardless as when such analysis may be performed, it should be clear that various information and/or heuristics may be evaluated by encoder 112. In certain example implementations, encoder 112 may also receive and consider user inputs.

As illustrated, one or more functions 212 may be provided and/or otherwise employed by encoder 112 to relate an anchor point to one or more non-anchor points. Function(s) 212, in this example, is representative of any mathematical and/or probabilistic function and/or functions that may be used to model expected signal data 210 for at least the selected position points within at least a portion of a region of space. Thus, for example, function(s) 212 may comprise one or more linear functions, non-linear functions, quadratic functions, logarithmic functions, etc., which may be used to estimate or otherwise model to some acceptable degree the expected signal data for one or more transmitted signals from one or more radio transmitters.

For example, for each and/or certain selected radio transmitters) 104, at least one function 212 may be used to provide a local ranging model that mathematically and/or probabilistically relates to an expected signal data to at least a subset of position points. Function 212 may provide a local ranging model that represents such expected signal data as a function, e.g., a substantially smooth and/or contiguous function. Such a function may be associated with one or more parameter values that may be based, at least in part, on the expected signal data within region associated with the subset of position points. Such parameter values and/or other like information relating to the function and/or local ranging model may be provided as part of an encoded version 214 of expected signal data.

Consequently, a decoder 114 in a mobile station may establish a decoded version of expected signal data based, at least in part, on the encoded version 214. Hence, for example, decoder 114 may employ a (decoding) function 212' that corresponds in some manner to the (encoding) function 212. Thus, in certain instances, a (decoding) function 212' may be the same as or an inverse and/or other like applicable adaptation of the (encoding) function 212.

As illustrated in greater detail in subsequent examples, in certain instances expected signal data 210 and/or one or more parameter values associated with function(s) 212, and hence encoded and decoded versions, may comprise and/or otherwise relate to a mean value and a variance value for signal strength, signal propagation time, and/or other like signal characteristic.

Encoded version 214 may, for example, identify at least an anchor point and one or more parameter values. In certain example implementations, encoded version 214 may also identify or otherwise indicate in some manner that there is a relationship between an anchor point and one or more non-anchor points. For example, in certain instances, non-anchor points may be identified (e.g., using an identifier) along with an identifier of its respective anchor point. In other examples, it may be useful to identify an anchor point and then list therewith identifiers of its respective non-anchor points.

In certain example implementations, encoded version 214 may, as applicable, identify function(s) 212. For example, in certain implementations, different functions may be used for different subsets of position points/anchor points, different radio transmitters, different mobile stations, different times, etc.

As illustrated, computing device 106 may take the form of a specific computing device comprising one or more processing units 202 that perform data processing (e.g., in accordance with all or part of the techniques provided herein) coupled to memory 204 via one or more connections 206. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220. As illustrated, memory 204 and/or computer readable medium 220 may comprise computer-implementable instructions 222 associated with data processing (e.g., in accordance with the techniques provided herein).

Figure 3:
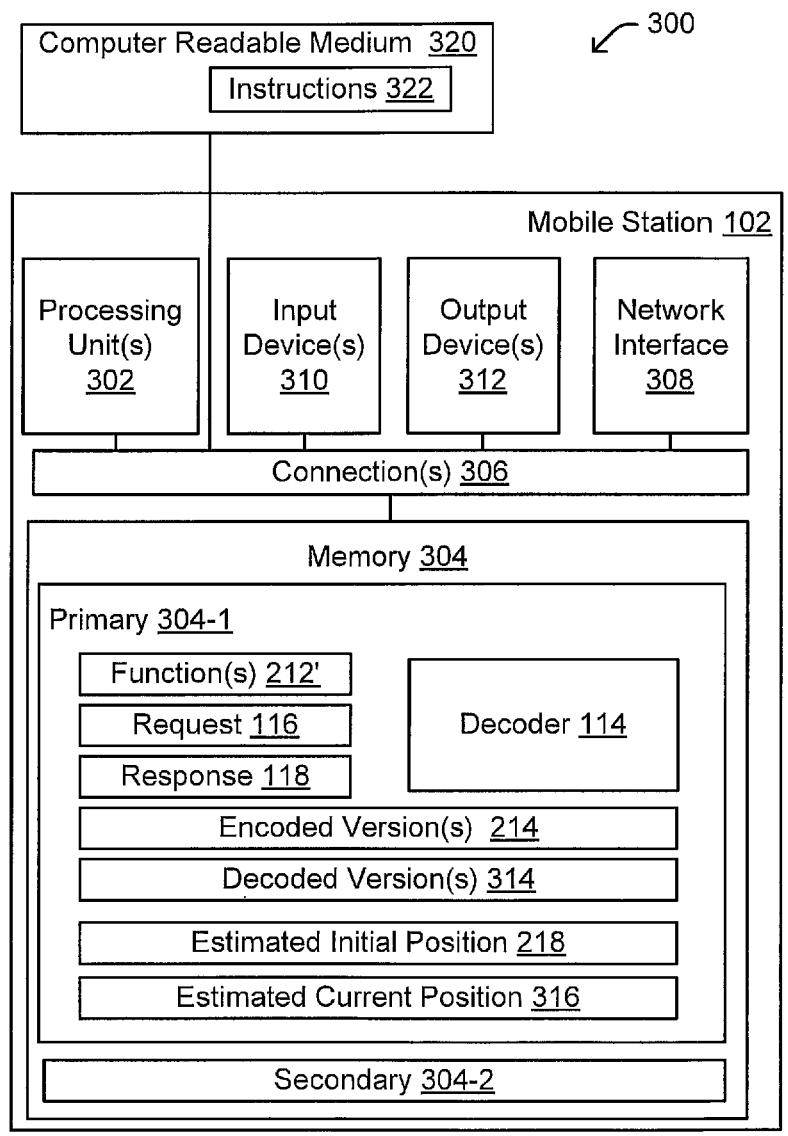
FIG. 3 is a schematic block diagram illustrating certain features of an example mobile station capable of receiving and using an encoded version of expected signal data, in accordance with an implementation.

Reference is made next to FIG. 3, which is a schematic block diagram illustrating certain features of mobile station 102, for example as in FIG. 1, capable of obtaining encoded version 214 of expected signal data and establishing a decoded version 314.

FIG. 3 shows a specific apparatus 300 in the form of a mobile station 102 which may act, at least in part, as a decoder 114 to establish one or more decoded versions 314 of the expected signal data based on one or more encoded versions 214 received from one or more computing devices 106. In certain example implementations, apparatus 300 may take the form of any electronic device that may be reasonably moved about by a user.

With this mind, as illustrated in FIG. 3, example mobile station 102 may comprise one or more processing units 302, memory 304, connections 306, a network interface 308, one or more user input devices 310, and one or more user output devices 312. As shown, memory 304 may comprise a primary memory 304-1, and/or a secondary memory 304-2. Here, for example, primary memory 304-1 is illustrated as storing information relating to decoder 114, which may be executed or used by processing unit(s) 302. For example, decoder 114 may be executed by processing unit(s) 302 to generate a request 116 for encoded version(s) 214 and initiate transmission of such to one or more computing devices 106 via network interface 308. For example, decoder 114 may be executed by processing unit(s) 302 to handle a response 118 received from one or more computing devices 106 via network interface 308.

As illustrated, mobile station 102 may take the form of a specific computing device comprising one or more processing units 302 to perform data processing (e.g., in accordance with all or part of the techniques provided herein) coupled to memory 304 via one or more connections 306. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile station 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 320. As illustrated, memory 304 and/or computer readable medium 320 may comprise computer-implementable instructions 322 associated with data processing (e.g., in accordance with the techniques provided herein).

As illustrated in the example in FIG. 3, at times, memory 304 may store information relating to one or more functions 212', request 116, response 118, encoded version(s) 214, decoded version(s) 314, estimated initial position 218, and an estimated current position 316. Here, estimated current position 316 represents an estimated current position of mobile station as determined, at least in part, using at least a portion of at least one decoded version 314 along with signal information obtained from at least one transmitted signal received from at least one radio transmitter 104.

In certain example implementations, as illustrated, mobile station 102 may further comprise one or more user input devices 310 (e.g., keyboard, touch screen, etc.) and/or one or more user output devices 312 (e.g., a display, a projector, a speaker, etc.). Hence, for example, location based service information may be presented to the user via some form of user output. Also, user input may be received which relates to location based services or other capabilities.

Although not illustrated, it should be understood that mobile station 102 may be enabled to perform a variety of tasks, some or many of which may be unrelated to location based services and/or other like position estimation capabilities. Thus, mobile station 102 may comprise a GPS or other like global navigation satellite system (GNSS) receiver (not shown) that may be used to establish estimated initial position 218, for example. Additionally, it should be understood that decoder 114 may be representative of one or more capabilities associated with location based services and/or other like position estimation.

Figure 4:
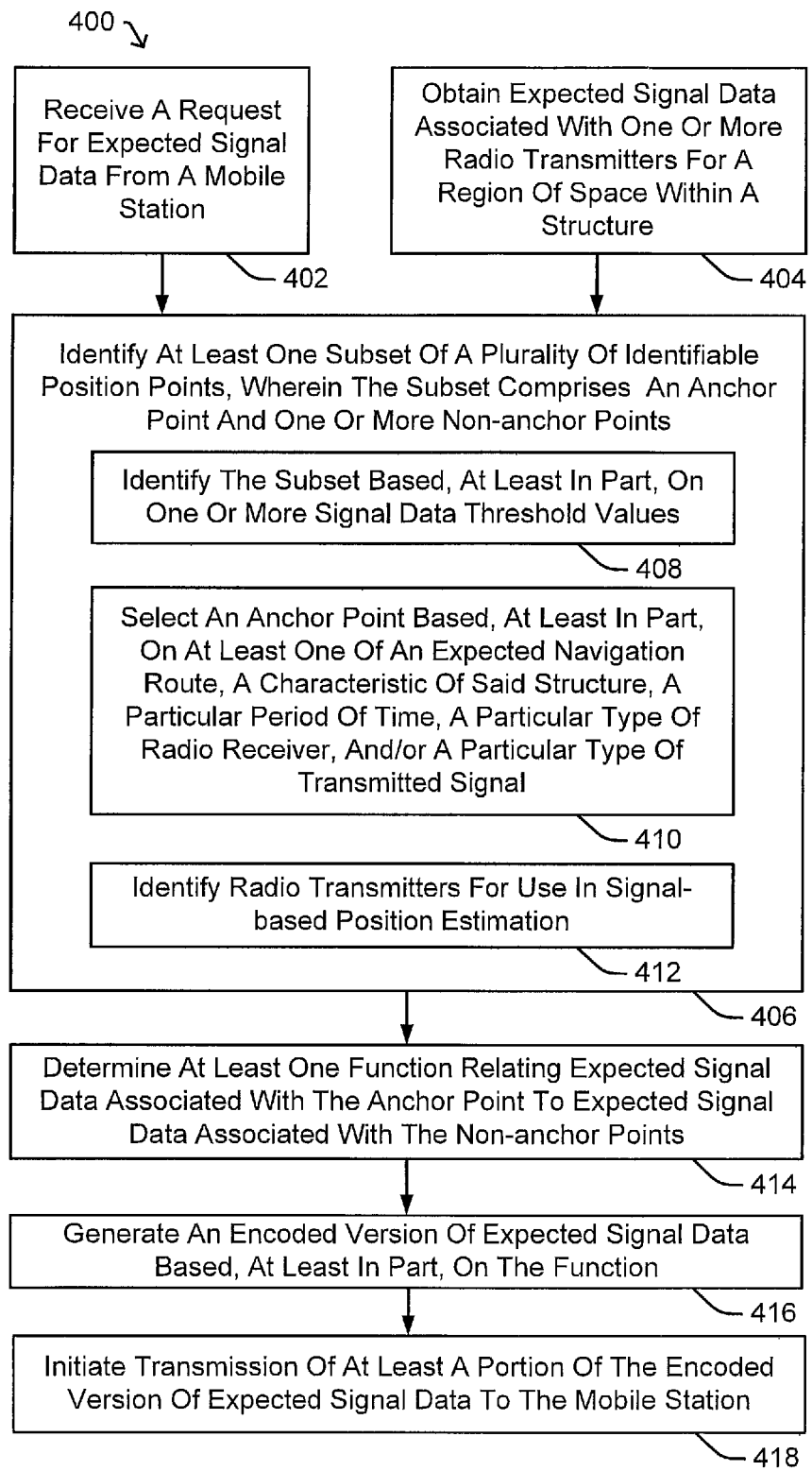
FIG. 4 is a flow diagram illustrating certain features of an example process for establishing an encoded version of expected signal data, in accordance with an implementation.

FIG. 4 is a flow diagram illustrating certain features of a process 400 that may, for example, be implemented in an encoder 112 and/or other like capability one or more computing devices 106 (FIG. 1) to establish an encoded version 214 of expected signal data.

At block 402, which may be optional, a request for an encoded version of expected signal data may be received from a mobile station. Such a request may take the form of one or more messages transmitted over one more communication links. Such a request may indicate an estimated initial position and/or estimated trajectory of the mobile device, and/or other information indicative of a specific structure and/or region of space for which an encoded version of expected signal data may be desired or useful.

At block 404, expected signal data associated with one or more radio transmitters for a region of space (e.g., within or otherwise associated with a structure) may be obtained. For example, expected signal data may be obtained from one or more other resources (devices) and/or maintained locally by one or more computing devices. Some expected signal data may, for example, be based, at least in part, on data collected by one or more devices, such as, for example, a wireless signal "sniffer" and/or other like enabled device that detects and measures certain characteristics regarding transmitted signals from radio transmitters. Some expected signal data may, for example, be based, at least in part, on estimated data obtained from one or more models that may simulate and characterize a signaling environment. Some expected signal data may, for example, be based, at least in part, on human user inputs. Some expected signal data may, for example, be interpolated or otherwise derived from other expected signal data. In certain instances, for example, expected signal data may comprise information that may relate to a heat map or other like radio map.

In certain example implementations, expected signal data and resulting decoded versions of expected signal data may relate to the same or similar position points and/or different position points. Thus, an expected signal data may relate initially to a set of position points uniformly distributed by a first distance, and the decoded version may relate to a set of position points uniformly distributed by a second distance, wherein the first and second distances may be different. Hence, for example, a first distance may be twice that of a second distance, e.g., in examples wherein the decoder effectively reduces the number of non-anchor frames by half.

At block 406, at least one subset of a plurality of identifiable position points may be identified. Here, for example, a subset may comprise an anchor point and one or more non-anchor points. At block 408, for example, a subset may be identified based, at least in part, on one or more signal data threshold values. At block 410, for example, an anchor point may be selected based, at least in part, on at least one of an expected navigation route, a characteristic of said structure, a particular period of time, a particular type of radio receiver, a particular type of transmitted signal, and/or other like information or any combination thereof. At block 412, for example, radio transmitters for use in signal-based position estimation may be identified for use in signal-based position estimation in the region of the subset of position points.

At block 414, at least one function may be determined which relates (or otherwise models) expected signal data associated with an anchor point to expected signal data associated with one or more non-anchor points. At block 416, an encoded version of expected signal data may be established based, at least in part, on the function. At block 418, at least a portion of an encoded version of expected signal data may be transmitted or otherwise provided to a mobile station.

Figure 5:
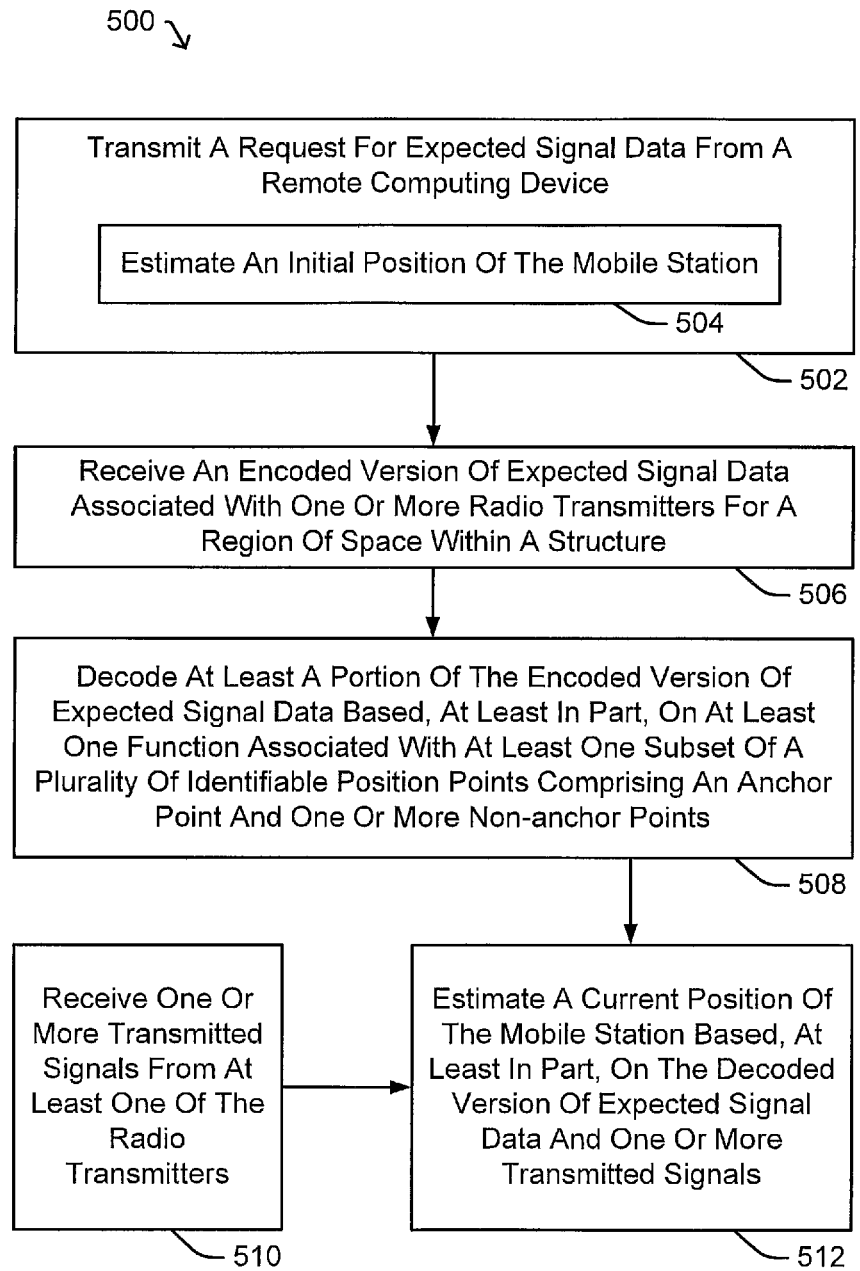
FIG. 5 is a flow diagram illustrating certain features of an example process for establishing a decoded version of expected signal data, in accordance with an implementation.

FIG. 5 is a flow diagram illustrating certain features of a process 500 that may, for example, be implemented in a decoder 114 and/or other like capability a mobile station 102 (FIG. 1) to establish a decoded version 314 of expected signal data 210 (FIG. 3).

At block 502, which may be optional, a request for an encoded version of expected signal data may be transmitted or otherwise provided to one or more remote computing devices. Such a request may take the form of one or more messages transmitted over one more communication links. At block 504, for example, an initial position and/or trajectory may be estimated for the mobile station. Thus, a request may indicate an estimated initial position and/or estimated trajectory of the mobile device, and/or other information indicative of a specific structure and/or region of space for which an encoded version of expected signal data may be desired or useful.

At block 506, an encoded version of expected signal data may be received. Here, for example, an encoded version of expected signal data may be associated with one or more radio transmitters for a region of space within a structure.

At block 508, at least a portion of an encoded version of expected signal data may be decoded based, at least in part, on at least one function. Here, for example, a function may be associated with at least one subset of a plurality of identifiable position points comprising an anchor point and one or more non-anchor points.

At block 510, one or more transmitted signals may be received from at least one of the radio transmitters. Here, for example, signal characteristics may be obtained based on the received signals. For example, signal strength information may be measured or otherwise obtained. For example, signal propagation time information may be obtained. In certain instances, at block 510, bidirectional communication may occur between a radio transmitter and a mobile station.

At block 512, a current position of a mobile station may be estimated or otherwise determined based, at least in part, on a decoded version of expected signal data and one or more transmitted signals.

Figure 6A:
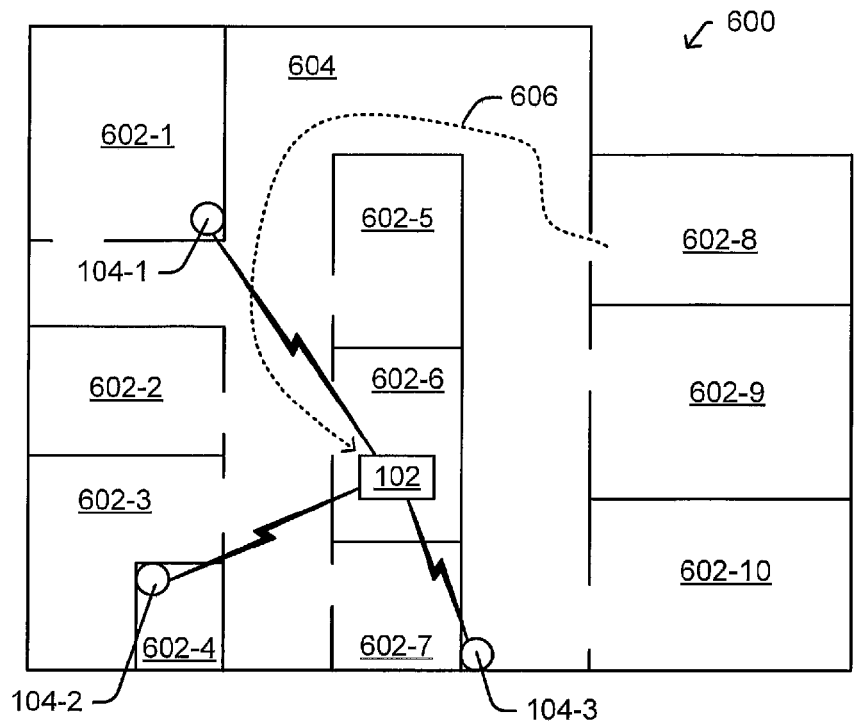
FIG. 6A is floor plan diagram illustrating certain features of a portion of an example structure for which an encoded version of expected signal data may be provided to a mobile station for decoding and use in estimating its position, in accordance with an implementation.

Attention is drawn next to FIG. 6A, which is floor plan diagram illustrating certain features of a portion of a example structure, e.g., a floor 600 of a building, for which encoded expected signal data may be provided to a mobile station 102 for decoding and use in estimating its position.

As shown, example floor 600 comprises a plurality of rooms 602 connected via a hallway 604. Radio transmitters 104-1, 104-2 and 104-3 are shown in room 602-1, room 602-4 and hallway 604, respectively. Mobile station 102 is illustrated has being positioned in room 602-6. A navigation route 606 is illustrated extending from room 602-8 through hallway 604 to room 602-6. Navigation route illustrates an example movement/trajectory of mobile station 102. In its current position in room 602-6, mobile station is illustrated as being capable of receiving transmitted signals from radio transmitters 104-1, 104-2 and 104-3.

Figure 6B:
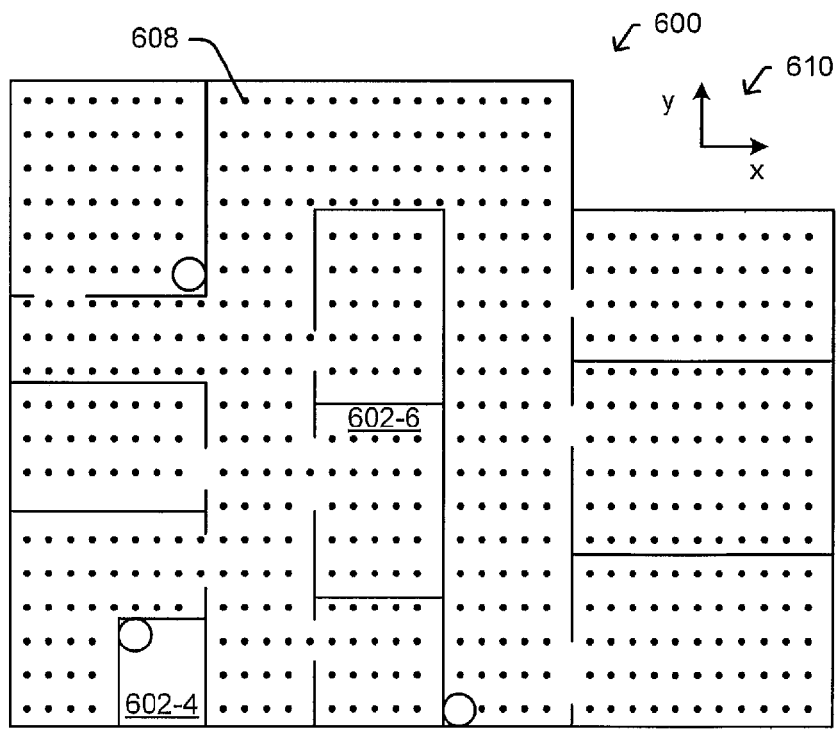
FIG. 6B is floor plan diagram similar to FIG. 6A, further illustrating an example layout of position points for which an encoded version of expected signal data may be provided to a mobile station, in accordance with an implementation.

Reference is made next to FIG. 6B, wherein a plurality of position points 608 are shown overlaying example floor 600. Here, for example, position points 608 are arranged in a grid pattern having rows parallel to an x-axis and columns parallel to a y-axis (e.g., see directional arrows 610). Notice that in this example some position points are not shown as they fall on the lines representing walls. Also, note that in this example, position point are not shown in room 602-4, which in this example, is deemed inaccessible for the mobile station's user (e.g., this room may be an equipment space, etc.). Hence, in certain instances, encoder 112 and/or decoder 114 may ignore such position points.

Figure 7:
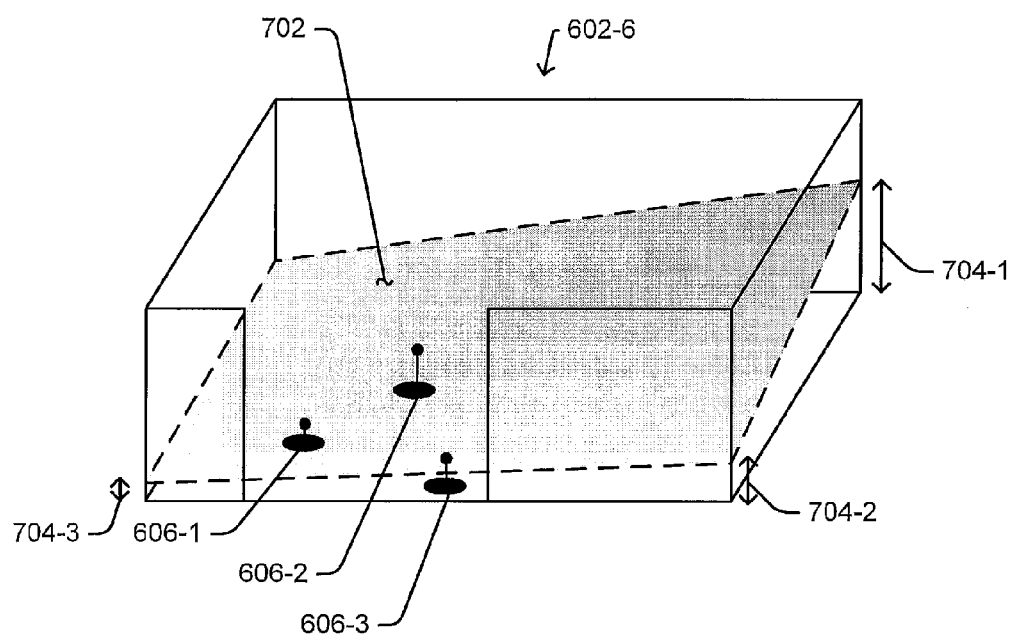
FIG. 7 is a perspective rendering of one room within the example floor plan diagrams of FIGS. 6A and 6B showing an example smooth linear function relationship of expected signal data between position points within the room based on which an encoded version of expected signal data may be provided established, in accordance with an implementation.

Reference is now made to FIG. 7, which is a perspective rendering of room 602-6 within example floor 600. Here, by way of visual illustration, a sloping plane 702 is depicted as representing a heat map (e.g., via a shading and three-dimensional rendering). This example sloping plane 702 may, for example, be generated using a linear function that models a relationship of expected signal data for position points within the room. Here, for example, a magnitude of the applicable signal data is greater at one corner (e.g., see magnitude 704-1) than it is at the other three corners (e.g., see magnitudes 704-2 and 704-3). Thus, for example, if the signal data is associated with a signal strength then in this example, a transmitted signal from a radio transmitter 104 (not shown) is expected to have the highest strength at or near the corner with magnitude 104-1 (e.g., the radio transmitter may be located closest to this corner). Conversely, for example, if the signal data is associated with a signal propagation time then in this example, a transmitted signal from a radio transmitter 104 (not shown) is expected to have the shortest propagation time at the corner with magnitude 104-3 (e.g., the radio transmitter may be located closest to this corner).

Position points 606-1, 606-2 and 606-3 are also illustrated in FIG. 7 along with representative magnitude vectors extending upward to different values on sloping plane 702. Accordingly, it may be seen that expected signal data for each of these position points may be related based on a function. Thus, in this example, one of these position points may be selected as an anchor point and the other related to the anchor point as non-anchor points. For example, positioning point 606-1 may be selected as an anchor point and position points 606-2 and 606-3 related as non-anchor points in an encoded version of expected signal data.

As illustrated in the examples herein, an anchor point may be used to define a local model which may represent a good fit for nearby non-anchor position points. Thus, for example, with RSSI or RTT signal data, a smooth function may serve as a model within local regions such as a room, or within a segment of hallway.

Accordingly, in one example of an encoded version of expected signal data, a first entry for an anchor point may comprise a bitmap indicating which radio transmitters may be useful for ranging from this anchor point. For instance, if there are M radio transmitters serving a floor, a bitmap may be M bits long, wherein a "0" may identify that a radio transmitter may not be useful (e.g., perhaps it is out of range) and a "1" identify that a radio transmitter may be useful. Such example encoded version of expected signal data may also comprise information relating to a function used to model each useful radio transmitter. By way of example, if a linear function is used then for each anchor point an encoded version may comprise a list or other like arrangement of parameters for each radio transmitter as modeled. For example, in the following linear function four parameters, namely $c_1$, $c_2$, $c_3$, and $c_4$ may be provided. Thus, an expected signal data value may be given by:

$$\text{Mean Value} = c_1*(x-x_0) + c_2*(y-y_0) + c_3; \text{Variance Value}(\text{Sigma}) = c_4$$

Where $x_0$, $y_0$ are the coordinates of the anchor point. Note that the expected signal data value for the anchor point is mean=$c_3$ and sigma=$c_4$.

Thus, Table 1 below shows an example, format for an Anchor Point as represented in an encoded version:

TABLE 1

| Anchor Point ID | Radio Transmitter Bitmap | Radio Transmitter Model 1 | Radio Transmitter Model 2 | ... | Radio Transmitter Model K |
|---|---|---|---|---|---|

In this example, a non-anchor point may be determined using a (decoding) function to determine a mean and sigma using an $(x-x_0)$ and $(y-y_0)$ distance between itself and the anchor point. In certain example implementations, such distance differences may be provided in a lookup or other like form which lists position points (e.g., by identifier, etc.). Thus, for example, in certain instances non-anchor points as represented in an encoded version may occupy $\log 2(N)$ bits which may refer to a "best" anchor point, or simply an identifier of the anchor point, where N is the number of anchor points. Such a format may allow non-anchor points to occur in any order.

Thus, Table 2 below shows an example, format for a non-anchor point as represented in an example encoded version:

TABLE 2

| Non-Anchor Point ID 1 | Anchor Point ID |
|---|---|
| ... | ... |
| Non-Anchor Point ID m | Anchor Point ID |

Alternatively, for example, non-anchor points may be listed (e.g., one at a time) along with a related anchor point. This example format may save space and/or may allow for a "tiled" solution, e.g., wherein each tile corresponds to a subset of position points (anchor point and its related non-anchor points). Such tiling may, for example, break up a large data file (map) into segments which may be selectively transmitted to a mobile station.

Thus, Table 3 below shows an example, format for non-anchor points as represented in an example encoded version:

TABLE 3

| Anchor Point ID | Radio Transmitter Bitmap | Radio Transmitter Model 1 | ... | Radio Transmitter Model k | Non-Anchor Point ID 1 | ... | Non-Anchor Point ID m |
|---|---|---|---|---|---|---|---|

As an example, consider again a structure/region with ten thousand position points and sixteen radio transmitters, wherein mean and sigma are each represented by one byte. Recall, that the original expected signal data (for all radio transmitters) would amount to about 320 kB. Now consider having five hundred and twelve anchor points. Assume that one byte is used for model coefficients ($c_1$, $c_2$, $c_3$, and $c_4$). Suppose each anchor point only refers to the nearest eight radio transmitters in the sixteen-bit radio transmitter bitmap. Also, suppose each non-anchor point reference uses sixteen bits to refer to its related anchor point identifier (ID). As such the size of the encoded version is about 35 kB, which is about a 10× savings. If non-anchor points are listed immediately after the corresponding anchors (e.g., in a tiled format), rather than using explicit references, the encoded version would be about 16 kB, which is about a 20× savings.

In certain further example implementations, an encoder may be arranged to select anchor points to ensure that the error in a decoded version remains within a desired level. This may be addressed, for example, by identifying and implementing an appropriate function and model parameters for each anchor point. In certain instances a heuristic based on a reduced routing graph may be useful. Here, for example, it may be useful to reduce a number of position points for consideration as anchor points by ranking position points in a routing graph. For example, such a ranking may be based, at least in part, on how large a radius of substantially open space surrounds a given position point.

With this in mind, for example, an encoder may identify a subset of position points and/or select an anchor point based, at least in part, by first considering "unvisited" points from a routing graph which have a highest rank. Next, a least squares fit may be made of model parameters to expected signal data values for all points within a routable distance D of the anchor point (e.g., using a routable distance may prevent crossing walls and/or other like obstacles). Once related to an anchor point, these non-anchor points may be marked in the routing graph as "visited". Such a process may continue until no more points can be selected, or until a maximum allowed number of anchor points has been reached.

In this manner, for example, the decoder may identify position points that relate to the anchor point with an error less than some threshold value (e.g., 3 dB). Note that a typical standard deviation for an RSSI is often about 4-6 dB. The error may be reduced further, if needed, by adding more anchor points (e.g., near areas with high error).

Anchor points may be used to efficiently partition a graph into distinct regions, where each region may relate to a subset of position points associated with an anchor point. These regions may, for example, be locally contiguous or locally confined areas where RSSI or RTT may be represented accurately by planes and/or other simple curves, and/or even certain like non-linear functions. Thus, such partitioning introduced during encoding may be useful as well as large data files (graphs) may be sent as tiles. By sending tiles that correspond to the expected signal data regions, the problem of "breaking" a large graph into pieces for transmission as tiles may be inherently solved. Furthermore, for example, such tiles may be chosen based on routing graph and/or other like information. Thus, as a user traverses a routing graph, an appropriate tile or tiles (e.g., for position points within routing distance D) may be generated and transmitted.

In certain example implementations, certain model parameters may relate to certain times or time periods, etc. Thus, for example, if time is a parameter, an expected signal value may be based on (x, y) and some time. Here, an appropriate function and model parameters may be provided to account for periodic changes due to day verses night, for example, based on expected changes in the number of people in a venue, doors being opened and closed, and so forth.

It should be further recognized that a computing device performing the encoding and tiling may make certain tradeoffs between data accuracy, communication bandwidth, available memory, and/or decoding complexity. In certain instances, for example, there may be different encoded versions (e.g., map representations, different number of anchor points, different lookup formats, etc.) for different types of mobile stations. Further, in certain instances, different models, functions, and/or the like may be implemented for different anchor points.

In certain example implementations, certain information regarding anchor points and/or non-anchor points may be further used to encode user density data, other type of data about an environment, and/or the like, which may be considered in some manner. For example, a routing function or other like capability may consider such information to improve routing decisions, etc.

The example techniques described herein may help to avoid some drawbacks typically seen in certain data compression schemes. For example, while one might use a lossless compression, such as zip, but the resulting compressed file may still be significantly large. One might also consider converting signal strength information to an image, for example by letting each grid point be a pixel, and then use known image compression such as JPEG. Here, however, there may be of a lack of flexibility, since typical image compression may not relate or consider certain underlying physical aspects of a signal. Also, typical image compression uses regular blocks, rather than taking the geometry of the building into account, which might lead to compression artifacts across walls, or other areas with sharp changes in signal characteristics.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   with at least one computing device:
      obtaining one or more signals representing expected signal data for one or more radio transmitters for a region of space within a structure, said expected signal data corresponding to a plurality of identifiable position points within said region of space;
      identifying at least one subset of said plurality of identifiable position points, said at least one subset comprising an anchor point and one or more non-anchor points;
      determining at least one function for mathematically and/or probabilistically relating said expected signal data for said anchor point to said expected signal data for said one or more non-anchor points within a portion of said region of space comprising said at least one subset of said plurality of identifiable position points; and
      generating one or more signals representing an encoded version of said expected signal data of said one or more radio transmitters for said region of space based, at least in part, on said at least one function.

2. The method as recited in claim 1, wherein said at least one function comprises a local ranging model.

3. The method as recited in claim 1, wherein said local ranging model represents said expected signal data within said portion of said region of space as a function.

4. The method as recited in claim 1, wherein determining said at least one function further comprises determining one or more parameter values for said at least one function based, at least in part, on said expected signal data within said portion of said region of space.

5. The method as recited in claim 4, wherein said one or more parameter values comprise at least one of a mean value and/or a variance value.

6. The method as recited in claim 5, wherein said encoded version of said expected signal data identifies at least said anchor point and comprises said at least one of said one or more parameter values.

7. The method as recited in claim 6, wherein said encoded version of said expected signal data further identifies a relationship of said anchor point and said one or more non-anchor points.

8. The method as recited in claim 1, wherein said at least one function is for said expected signal data of a specific radio transmitter of said one or more radio transmitters.

9. The method as recited in claim 1, further comprising:
   with said at least one computing device:
      initiating transmission of at least a portion of said encoded version of said expected signal data to a mobile station.

10. The method as recited in claim 9, wherein said portion of said encoded version of said expected signal data is for at least one part of said region of space.

11. The method as recited in claim 10, wherein said at least one part of said region of space comprises at least said anchor point.

12. The method as recited in claim 9, further comprising:
   initiating transmission of said at least said portion of said encoded version of said expected signal data to said mobile station in a response to a request from said mobile station.

13. The method as recited in claim 12, selecting said at least said portion of said encoded version of said expected signal data based, at least in part, on an estimated initial position of said mobile station with respect to said region of space.

14. The method as recited in claim 1, further comprising:
   with said at least one computing device:
      identifying said at least one subset of said plurality of identifiable position points based, at least in part, on one or more signal data threshold values.

15. The method as recited in claim 1, further comprising:
   with said at least one computing device:
      selecting at least said anchor point based, at least in part, on at least one of an expected navigation route, a characteristic of said structure, a particular period of time, a particular type of radio receiver, and/or a particular type of transmitted signal.

16. The method as recited in claim 1, further comprising:
with said at least one computing device:
identifying at least one of said one or more radio transmitters for use in signal-based position estimation at said anchor point and said one or more non-anchor points.

17. The method as recited in claim 1, wherein at least a portion of said expected signal data is based, at least in part, on at least one of a signal strength and/or a signal propagation time.

18. The method as recited in claim 1, wherein at least a portion of said expected signal data is based, at least in part, on previously measured signal data, and/or estimated signal data.

19. The method as recited in claim 1, wherein at least a portion of said expected signal data corresponds to at least one of: a particular period of time, a particular type of radio receiver, and/or a particular type of transmitted signal.

20. The method as recited in claim 1, wherein said plurality of identifiable position points comprises at least one non-uniformly distributed position point.

21. An apparatus comprising:
a network interface; and
at least one processing unit to:
obtain expected signal data for one or more radio transmitters for a region of space within a structure, said expected signal data corresponding to a plurality of identifiable position points within said region of space;
identify at least one subset of said plurality of identifiable position points, said at least one subset comprising an anchor point and one or more non-anchor points;
determine at least one function for mathematically and/or probabilistically relating said expected signal data for said anchor point to said expected signal data for said one or more non-anchor points within a portion of said region of space comprising said at least one subset of said plurality of identifiable position points;
determine an encoded version of said expected signal data of said one or more radio transmitters for said region of space based, at least in part, on said at least one function; and
initiate transmission of at least a portion of said encoded version of said expected signal data to a mobile station via said network interface.

22. The apparatus as recited in claim 21, said at least one processing unit to further determine one or more parameter values for said at least one function, and wherein said encoded version of said expected signal data identifies at least said anchor point and said one or more non-anchor points related thereto, and comprises said at least one of said one or more parameter values.

23. The apparatus as recited in claim 21, wherein said at least one function is for said expected signal data of a specific radio transmitter of said one or more radio transmitters.

24. The apparatus as recited in claim 21, further comprising:
receiving a request for expected signal data from said mobile station via said network interface.

25. The apparatus as recited in claim 21, further comprising:
with said at least one processing unit:
identify said at least one subset of said plurality of identifiable position points based, at least in part, on one or more signal data threshold values.

26. The apparatus as recited in claim 21, further comprising:
with said at least one processing unit:
select at least said anchor point based, at least in part, on at least one of an expected navigation route, a characteristic of said structure, a particular period of time, a particular type of radio receiver, and/or a particular type of transmitted signal.

27. The apparatus as recited in claim 21, further comprising:
with said at least one processing unit:
identify at least one of said one or more radio transmitters for use in signal-based position estimation at said anchor point and said one or more non-anchor points.

28. The apparatus as recited in claim 21, wherein at least a portion of said expected signal data is based, at least in part, on at least one of a signal strength and/or a signal propagation time.

29. The apparatus as recited in claim 21, wherein at least a portion of said expected signal data is based, at least in part, on at least one of: a particular period of time, a particular type of radio receiver, and/or a particular type of transmitted signal.

30. The apparatus as recited in claim 21, wherein said plurality of identifiable position points comprises at least one non-uniformly distributed position point.

31. An apparatus comprising:
means for obtaining expected signal data for one or more radio transmitters for a region of space within a structure, said expected signal data corresponding to a plurality of identifiable position points within said region of space;
means for identifying at least one subset of said plurality of identifiable position points, said at least one subset comprising an anchor point and one or more non-anchor points;
means for determining at least one function for mathematically and/or probabilistically relating said expected signal data for said anchor point to said expected signal data for said one or more non-anchor points within a portion of said region of space comprising said at least one subset of said plurality of identifiable position points;
means for determining an encoded version of said expected signal data of said one or more radio transmitters for said region of space based, at least in part, on said at least one function; and
means for transmitting at least a portion of said encoded version of said expected signal data to a mobile station.

32. The apparatus as recited in claim 31, further comprising:
means for receiving a request for expected signal data from said mobile station.

33. The apparatus as recited in claim 31, further comprising:
means for selecting at least said anchor point based, at least in part, on at least one of an expected navigation route, a characteristic of said structure, a particular period of time, a particular type of radio receiver, and/or a particular type of transmitted signal.

34. The apparatus as recited in claim 31, further comprising:
means for identifying at least one of said one or more radio transmitters for use in signal-based position estimation at said anchor point and said one or more non-anchor points.

35. The apparatus as recited in claim 31, wherein at least a portion of said expected signal data corresponds to at least one of: a particular period of time, a particular type of radio receiver, and/or a particular type of transmitted signal.

36. An article comprising:
a non-transitory computer readable medium having stored therein computer-implementable instructions executable by one or more processing units to:
obtain expected signal data for one or more radio transmitters for a region of space within a structure, said expected signal data corresponding to a plurality of identifiable position points within said region of space;
identify at least one subset of said plurality of identifiable position points, said at least one subset comprising an anchor point and one or more non-anchor points;
determine at least one function for mathematically and/or probabilistically relating said expected signal data for said anchor point to said expected signal data for said one or more non-anchor points within a portion of said region of space comprising said at least one subset of said plurality of identifiable position points;
generate an encoded version of said expected signal data of said one or more radio transmitters for said region of space based, at least in part, on said at least one function; and
initiate transmission of at least a portion of said encoded version of said expected signal data to a mobile station.

37. The article as recited in claim 36, said computer-implementable instructions being further executable by said one or more processing units to:
initiate transmission of at least said portion of said encoded version of said expected signal data in response to a request for expected signal data from said mobile station.

38. The article as recited in claim 36, said computer-implementable instructions being further executable by said one or more processing units to:
select at least said anchor point based, at least in part, on at least one of an expected navigation route, a characteristic of said structure, a particular period of time, a particular type of radio receiver, and/or a particular type of transmitted signal.

39. The article as recited in claim 36, said computer-implementable instructions being further executable by said one or more processing units to:
identify at least one of said one or more radio transmitters for use in signal-based position estimation at said anchor point and said one or more non-anchor points.

40. The article as recited in claim 36, wherein at least a portion of said expected signal data corresponds to at least one of: a particular period of time, a particular type of radio receiver, and/or a particular type of transmitted signal.

41. A method comprising:
with a mobile station:
obtaining one or more signals representing an encoded version of expected signal data for one or more radio transmitters for a region of space within a structure, said encoded version of said expected signal data being encoded based, at least in part, on at least one function corresponding to at least one subset of a plurality of identifiable position points within said region of space, said at least one subset comprising an anchor point and one or more non-anchor points, and said at least one function mathematically and/or probabilistically relating said expected signal data for said anchor point to said expected signal data for said one or more non-anchor points within a portion of said region of space comprising said at least one subset of said plurality of identifiable position points;
generating one or more signals representing a decoded version of said expected signal data based, at least in part, on said encoded version of said expected signal data and said at least one function;
receiving one or more transmitted signals from at least one of said one or more radio transmitters; and
estimating a current position of said mobile station based, at least in part, on said decoded version of said expected signal data and said one or more transmitted signals.

42. The method as recited in claim 41, wherein said at least one function comprises a local ranging model.

43. The method as recited in claim 42, wherein said local ranging model represents said expected signal data within said portion of said region of space as a function.

44. The method as recited in claim 42, wherein said local ranging model is responsive to one or more parameter values determined based, at least in part, on said expected signal data within said portion of said region of space.

45. The method as recited in claim 44, wherein said one or more parameter values comprise at least one of a mean value and/or a variance value.

46. The method as recited in claim 45, wherein said encoded version of said expected signal data identifies at least said anchor point and comprises said at least one of said one or more parameter values.

47. The method as recited in claim 46, wherein said encoded version of said expected signal data further identifies a relationship of said anchor point and said one or more non-anchor points.

48. The method as recited in claim 41, wherein said at least one function is based, at least in part, on said expected signal data for a specific radio transmitter of said one or more radio transmitters.

49. The method as recited in claim 41, further comprising:
with said mobile station:
initiating transmission of a request for at least a portion of said encoded version of said expected signal data.

50. The method as recited in claim 49, wherein said portion of said encoded version of said expected signal data corresponds to at least one part of said region of space.

51. The method as recited in claim 50, wherein said at least one part of said region of space comprises at least said anchor point.

52. The method as recited in claim 49, further comprising:
with said mobile station:
estimating an initial position of said mobile station with respect to said region of space.

53. The method as recited in claim 52, wherein said request for at least said portion of said encoded version of said expected signal data comprises information identifying said initial position.

54. The method as recited in claim 49, wherein said request for at least said portion of said encoded version of said expected signal data comprises information identifying an estimated trajectory of said mobile station.

55. The method as recited in claim 41, wherein at least said anchor point is selected based, at least in part, on at least one of an expected navigation route, a characteristic of said structure, a particular period of time, a particular type of radio receiver, and/or a particular type of transmitted signal.

56. The method as recited in claim 41, wherein said encoded version of said expected signal data is selected based, at least in part, on a determination that at least one of said one or more radio transmitters is suitable for use by said mobile station in estimating said current position.

57. The method as recited in claim 41, wherein at least a portion of said expected signal data is based, at least in part, on at least one of a signal strength and/or a signal propagation time.

58. The method as recited in claim 41, wherein at least a portion of said expected signal data is based, at least in part, on previously measured signal data, and/or estimated signal data.

59. The method as recited in claim 41, wherein at least a portion of said expected signal data corresponds to at least one of: a particular period of time, a particular type of radio receiver, and/or a particular type of transmitted signal.

60. The method as recited in claim 41, wherein said plurality of identifiable position points comprises at least one non-uniformly distributed position point.

61. A mobile station comprising:
a network interface; and
at least one processing unit to:
initiate transmission of a request for at least a portion of an encoded version of an expected signal data for one or more radio transmitters for a region of space within a structure, said encoded version of being encoded based, at least in part, on at least one function corresponding to at least one subset of a plurality of identifiable position points within said region of space, said at least one subset comprising an anchor point and one or more non-anchor points, and said at least one function mathematically and/or probabilistically relating said expected signal data for said anchor point to said expected signal data for said one or more non-anchor points within a portion of said region of space comprising said at least one subset of said plurality of identifiable position points;
obtain at least said portion of said encoded version of said expected signal data;
establish a decoded version of said expected signal data based, at least in part, on said encoded version of said expected signal data and said at least one function;
obtain information for one or more transmitted signals received via said network interface from at least one of said one or more radio transmitters; and
estimate a current position of said mobile station based, at least in part, on said decoded version of said expected signal data and said information for said one or more transmitted signals.

62. The mobile station as recited in claim 61, wherein said at least one function comprises a local ranging model.

63. The mobile station as recited in claim 61, wherein said at least one function is based, at least in part, on said expected signal data for a specific radio transmitter of said one or more radio transmitters.

64. The mobile station as recited in claim 61, said at least one processing unit to further:
estimate an initial position of said mobile station with respect to said region of space.

65. The mobile station as recited in claim 64, wherein said request for at least said portion of said encoded version of said expected signal data comprises information identifying said initial position.

66. The mobile station as recited in claim 61, wherein at least said anchor point is selected based, at least in part, on at least one of an expected navigation route, a characteristic of said structure, a particular period of time, a particular type of radio receiver, and/or a particular type of transmitted signal.

67. The mobile station as recited in claim 61, wherein said encoded version of said expected signal data is selected based, at least in part, on a determination that at least one of said one or more radio transmitters is suitable for use by said mobile station in estimating said current position.

68. The mobile station as recited in claim 61, wherein at least a portion of said expected signal data is based, at least in part, on at least one of a signal strength and/or a signal propagation time.

69. The mobile station as recited in claim 61, wherein at least a portion of said expected signal data corresponds to at least one of: a particular period of time, a particular type of radio receiver, and/or a particular type of transmitted signal.

70. The mobile station as recited in claim 61, wherein said plurality of identifiable position points comprises at least one non-uniformly distributed position point.

71. An apparatus for use in a mobile station, said apparatus comprising:
means for initiating transmission of a request for at least a portion of an encoded version of an expected signal data for one or more radio transmitters for a region of space within a structure, said encoded version of being encoded based, at least in part, on at least one function corresponding to at least one subset of a plurality of identifiable position points within said region of space, said at least one subset comprising an anchor point and one or more non-anchor points, and said at least one function mathematically and/or probabilistically relating said expected signal data for said anchor point to said expected signal data for said one or more non-anchor points within a portion of said region of space comprising said at least one subset of said plurality of identifiable position points;
means for obtaining at least said portion of said encoded version of said expected signal data;
means for establishing a decoded version of said expected signal data based, at least in part, on said encoded version of said expected signal data and said at least one function;
means for receiving one or more transmitted signals from at least one of said one or more radio transmitters; and
means for estimating a current position of said mobile station based, at least in part, on said decoded version of said expected signal data and said one or more transmitted signals.

72. The apparatus as recited in claim 71, further comprising:
means for estimating an initial position of said mobile station with respect to said region of space.

73. The apparatus as recited in claim 71, wherein said at least said anchor point is selected based, at least in part, on at least one of an expected navigation route, a characteristic of said structure, a particular period of time, a particular type of radio receiver, and/or a particular type of transmitted signal.

74. The apparatus as recited in claim 71, wherein said encoded version of said expected signal data is selected based, at least in part, on a determination that at least one of said one or more radio transmitters is suitable for use by said mobile station in estimating said current position.

75. The apparatus as recited in claim 71, wherein at least a portion of said expected signal data corresponds to at least one of: a particular period of time, a particular type of radio receiver, and/or a particular type of transmitted signal.

76. An article comprising:

a non-transitory computer readable medium having stored therein computer-implementable instructions executable by one or more processing units of a mobile station to:

initiate transmission of a request for at least a portion of an encoded version of an expected signal data for one or more radio transmitters for a region of space within a structure, said encoded version of being encoded based, at least in part, on at least one function corresponding to at least one subset of a plurality of identifiable position points within said region of space, said at least one subset comprising an anchor point and one or more non-anchor points, and said at least one function mathematically and/or probabilistically relating said expected signal data for said anchor point to said expected signal data for said one or more non-anchor points within a portion of said region of space comprising said at least one subset of said plurality of identifiable position points;

obtain at least said portion of said encoded version of said expected signal data;

establish a decoded version of said expected signal data based, at least in part, on said encoded version of said expected signal data and said at least one function;

obtain information for one or more transmitted signals received from at least one of said one or more radio transmitters; and estimate a current position of said mobile station based, at least in part, on said decoded version of said expected signal data and said information for said one or more transmitted signals.

77. The article as recited in claim 76, said computer-implementable instructions being further executable by said one or more processing units to:

estimate an initial position of said mobile station with respect to said region of space.

78. The article as recited in claim 76, wherein said at least said anchor point is selected based, at least in part, on at least one of an expected navigation route, a characteristic of said structure, a particular period of time, a particular type of radio receiver, and/or a particular type of transmitted signal.

79. The article as recited in claim 76, wherein said encoded version of said expected signal data is selected based, at least in part, on a determination that at least one of said one or more radio transmitters is suitable for use by said mobile station in estimating said current position.

80. The article as recited in claim 76, wherein at least a portion of said expected signal data corresponds to at least one of: a particular period of time, a particular type of radio receiver, and/or a particular type of transmitted signal.

* * * * *